US012566672B2

(12) United States Patent
Yadav et al.

(10) Patent No.: US 12,566,672 B2
(45) Date of Patent: Mar. 3, 2026

(54) LEVERAGING BACKUP PROCESS METADATA FOR CLOUD OBJECT STORAGE SELECTIVE DELETIONS

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 17/952,500

(22) Filed: Sep. 26, 2022

(65) Prior Publication Data

US 2024/0103974 A1　　Mar. 28, 2024

(51) Int. Cl.
*G06F 11/14* (2006.01)
*G06F 11/1446* (2026.01)

(52) U.S. Cl.
CPC ...... *G06F 11/1451* (2013.01); *G06F 11/1464* (2013.01); *G06F 2201/84* (2013.01)

(58) Field of Classification Search
CPC ............. G06F 11/1451; G06F 11/1464; G06F 2201/84
See application file for complete search history.

(56) References Cited

U.S. PATENT DOCUMENTS 7,831,560 B1 * 11/2010 Spertus ................. G06F 16/128
707/639
9,946,604 B1 * 4/2018 Glass .................. G06F 11/1451

11,720,548 B1 * 8/2023 Opincariu ......... G06F 16/24552
707/600
2006/0112112 A1 * 5/2006 Margolus .............. G06F 16/902
707/999.1
2007/0112866 A1 * 5/2007 Olson-Williams ...... G06F 16/22
707/999.2
2012/0254514 A1 * 10/2012 Nishikubo .......... G06F 12/0246
711/103
2014/0188804 A1 * 7/2014 Gokhale ................ G06F 16/27
707/645

(Continued)

*Primary Examiner* — Kavita Stanley
*Assistant Examiner* — Jedidiah P Ferrer
(74) *Attorney, Agent, or Firm* — Chamberlain, Hrdlicka, White, Williams & Aughtry; Aly Z. Dossa

(57) ABSTRACT

A method and system for leveraging backup process metadata for cloud object storage selective deletions. Under cloud object storage architecture, any unstructured data may be managed and stored in the cloud as objects. Objects thus provide an elastic, scalable format through which unstructured data may be maintained for a variety of purposes, including those directed to data backup, archiving, and/or disaster recovery. Further, any unstructured data, stored within any object, may pertain to one or many file(s). Should data, from multiple files, be stored within a shared object, any post-upload activity (e.g., modifications or deletions in keeping with data regulatory compliances) targeting said data, belonging to any one file or a subset of files, may be complex and resource-expensive. In addressing these undesirable qualities, embodiments disclosed herein use metadata, produced during and/or following backup processes protecting file data, to fulfill said post-upload activity resource-efficiently and without data compromising effects.

11 Claims, 5 Drawing Sheets

(56)     References Cited

U.S. PATENT DOCUMENTS

| | | | |
|---|---|---|---|
| 2015/0127609 A1* | 5/2015 | Hazlewood | G06F 11/1451 |
| | | | 707/624 |
| 2016/0301822 A1* | 10/2016 | Shimoda | H04N 1/00912 |
| 2018/0032446 A1 | 2/2018 | Amarendran et al. | |
| 2020/0026611 A1* | 1/2020 | Amlekar | G06F 11/1451 |
| 2020/0067855 A1* | 2/2020 | Leminen | G06Q 10/101 |
| 2020/0301882 A1 | 9/2020 | Pogde et al. | |
| 2020/0341856 A1* | 10/2020 | Chen | G06F 11/1453 |
| 2021/0019088 A1* | 1/2021 | Zhu | G06F 11/1004 |
| 2021/0133248 A1 | 5/2021 | Sharma et al. | |
| 2022/0050752 A1* | 2/2022 | Kirunge | G06F 11/1451 |
| 2022/0083685 A1* | 3/2022 | Reyes | G06F 11/1451 |

* cited by examiner

300
Computing
System

LEVERAGING BACKUP PROCESS METADATA FOR CLOUD OBJECT STORAGE SELECTIVE DELETIONS

BACKGROUND

Under cloud object storage architecture, any unstructured data may be managed and stored in the cloud as objects. Objects thus provide an elastic, scalable format through which unstructured data may be maintained for a variety of purposes, including those directed to data backup, archiving, and/or disaster recovery.

SUMMARY

In general, in one aspect, the invention relates to a method for implementing selective overwrites in backup data. The method includes identifying an item representing select backup host information; identifying, in association with the item, a data object stored on a backup target and a data object portion of the data object; and overwriting item content of the item reflected in the data object portion.

In general, in one aspect, the invention relates to a non-transitory computer readable medium (CRM). The non-transitory CRM includes computer readable program code, which when executed by a computer processor, enables the computer processor to perform a method for implementing selective overwrites in backup data. The method includes identifying an item representing select backup host information; identifying, in association with the item, a data object stored on a backup target and a data object portion of the data object; and overwriting item content of the item reflected in the data object portion.

In general, in one aspect, the invention relates to a system. The system includes a backup target storing backup host information; and a computer processor operatively connected to the backup target, and configured to perform a method for implementing selective overwrites in backup data. The method includes identifying an item representing select backup host information of the backup host information; identifying, in association with the item, a data object stored on the backup target and a data object portion of the data object; and overwriting item content of the item reflected in the data object portion.

Other aspects of the invention will be apparent from the following description and the appended claims.

DETAILED DESCRIPTION

Figure 1:
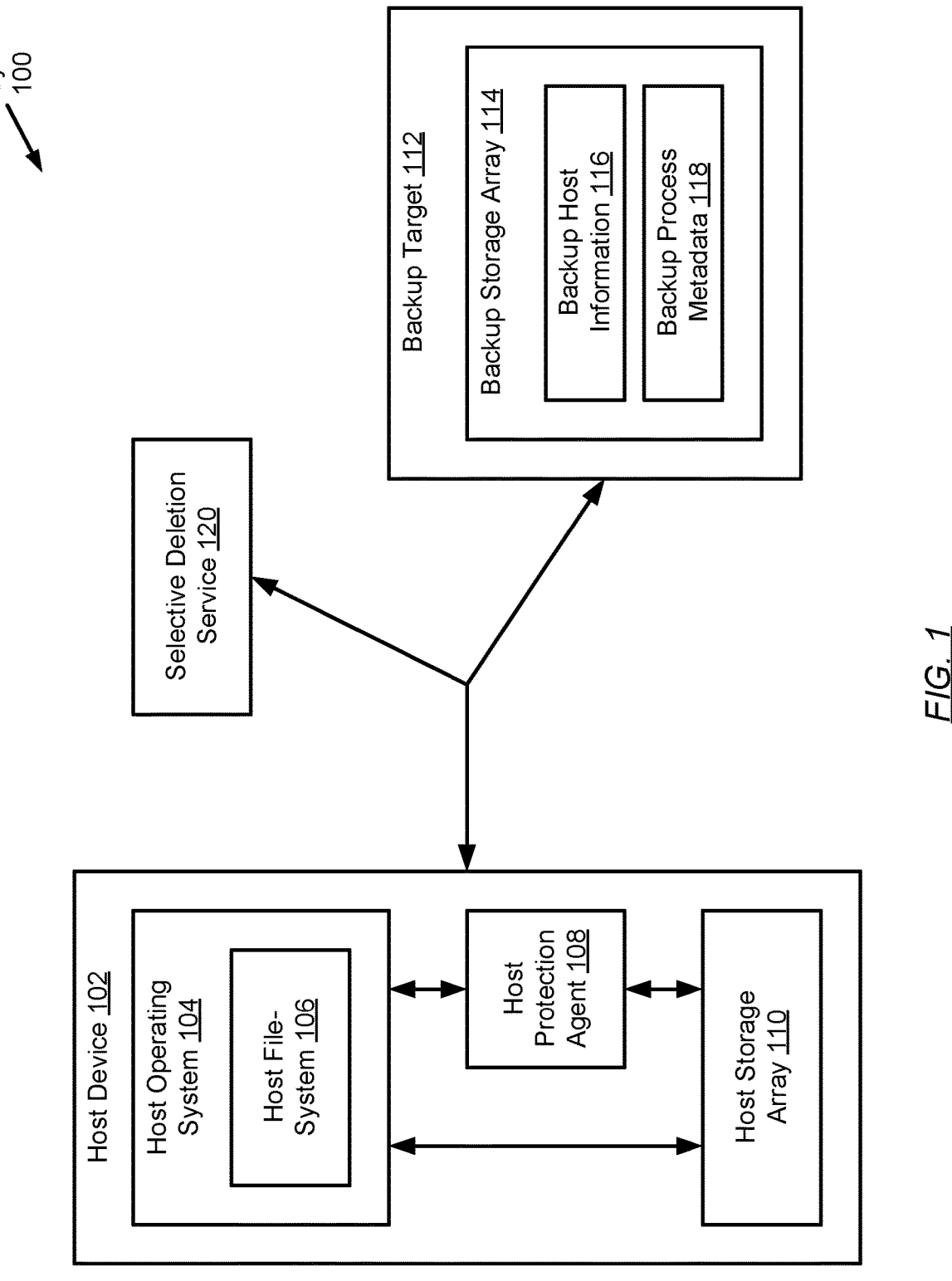
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to leveraging backup process metadata for cloud object storage selective deletions. Under cloud object storage architecture, any unstructured data may be managed and stored in the cloud as objects. Objects thus provide an elastic, scalable format through which unstructured data may be maintained for a variety of purposes, including those directed to data backup, archiving, and/or disaster recovery. Further, any unstructured data, stored within any object, may pertain to one or many file(s). Should data, from multiple files, be stored within a shared object, any post-upload activity (e.g., modifications or deletions in keeping with data regulatory compliances) targeting said data, belonging to any one file or a subset of files, may be complex and resource-expensive. In addressing these undesirable qualities, embodiments disclosed herein use metadata, produced during and/or following backup processes protecting file data, to fulfill said post-upload activity resource-efficiently and without data compromising effects.

FIG. 1 shows a system in accordance with one or more embodiments of the invention. The system (100) may include a host device (102), a backup target (112), and a selective deletion service (120). Each of these system (100) components is described below.

In one or many embodiment(s) of the invention, the host device (102) may represent any physical appliance or computing system configured to receive, generate, process, store, and/or transmit data, as well as to provide an environment in which one or many computer program(s) may execute thereon. The computer program(s) may, for example, implement large-scale and complex data processing; or implement one or more services offered locally or over a network (not shown). Further, in providing an execution environment for any computer program(s) installed thereon, the host device (102) may include and allocate various resources (e.g., computer processors, memory, storage, virtualization, network bandwidth, etc.), as needed, to the computer program (s) and/or the tasks (or processes) instantiated thereby. Examples of the host device (102) may include, but may not be limited to, a desktop computer, a laptop computer, a network server, a network mainframe, a smartphone, a tablet computer, or any other computing system similar to the exemplary computing system illustrated and described with respect to FIG. 3, below.

In one or many embodiment(s) of the invention, the host device (102) may include a host operating system (104), a host protection agent (108), and a host storage array (110). Each of these host device (102) subcomponents is described below.

In one or many embodiment(s) of the invention, the host operating system (104) may refer to a computer program that may execute on the underlying hardware of the host device (102), which may be responsible for overseeing host device (102) operations. To that end, and at least in part, the host operating system (104) may include functionality to: support fundamental host device (102) functions; schedule tasks; mediate interactivity between logical (e.g., software) and physical (e.g., hardware) host device (102) components; allocate host device (102) resources; and execute or invoke other computer program(s) executing on the host device (102). Further, one of ordinary skill will appreciate that the host operating system (104) may perform other functionalities without departing from the scope of the invention.

For example, the host operating system (104) may facilitate the access and/or manipulation of host information (described below) by one or many other computer program(s) (e.g., host protection agent (108)) executing on the host device (102). In facilitating the aforementioned access and/or manipulation, the host operating system (104) may implement a host file-system (106). The host file-system (106) may represent a physical file-system (also referred to as a file-system implementation), which may refer to a collection of subroutines concerned with the physical operation of one or many physical storage device(s). The host file-system (106), in this respect, may be concerned with the physical operation of the host storage array (110) (described below). Further, the host file-system (106) may employ host storage array (110) device drivers (or firmware) to process request file operations (e.g., read and/or write operations) from the aforementioned other computer program(s) executing on the host device (102). Device drivers enable the host file-system (106), and thus the host operating system (104), to manipulate physical storage (e.g., host storage array (110)) as appropriate.

In one or many embodiment(s) of the invention, host information may refer to any granularity of data (e.g., a data file, a data directory, etc.), as well as metadata descriptive thereof, that may have been generated, received, manipulated, and/or otherwise maintained on/by the host device (102). Examples of host information may include, but may not be limited to, application data and metadata associated with the computer program(s) (excluding the host operating system (104)) executing on the host device (102), user data and metadata associated with one or many user(s) (not shown) operating the host device (102), and system data and metadata associated with the host operating system (104). Host information is not limited to the aforementioned specific examples. Further, host information may, at least in part, be stored on or across the host storage array (110) (described below).

In one or many embodiment(s) of the invention, the host protection agent (108) may refer to a computer program that may execute on the underlying hardware of the host device (102), which may be responsible for facilitating backup and recovery operations entailing any granularity of host information (described above). To that end, and at least in part, the host protection agent (108) may include functionality to: protect any granularity of host information against loss (i.e., through backup operations); and reconstruct any granularity of host information following said loss (i.e., through recovery operations). Further, one of ordinary skill will appreciate that the host protection agent (108) may perform other functionalities without departing from the scope of the invention.

In one or many embodiment(s) of the invention, the host storage array (110) may refer to a collection of one or more physical storage devices (not shown) on which various forms of digital information—e.g., host information (described above)—may be maintained. Each physical storage device may encompass non-transitory computer readable storage media on which said digital information may be stored in whole or in part, and temporarily or permanently. Further, the host storage array (110) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) of the invention, the backup target (112) may represent any information backup, archiving, and/or disaster recovery storage system. The backup target (112) may be implemented using one or many storage server(s) (not shown). Each storage server may refer to a physical network server, or a virtual network server, that resides, or may be implemented, on a cloud computing environment. Additionally, or alternatively, the backup target (112) may be implemented using one or many computing system(s) similar to the exemplary computing system illustrated and described with respect to FIG. 3, below, where said computing system(s) may also reside, or may be implemented, on a cloud infrastructure.

In one or many embodiment(s) of the invention, the backup target (112) may include a backup storage array (114). The backup storage array (114) may refer to a collection of one or more physical storage devices (not shown) on which various forms of digital information—e.g., backup host information (116) and backup process metadata (118) (both described below)—may be maintained. Each physical storage device may encompass non-transitory computer readable storage media on which said digital information may be stored in whole or in part, and temporarily or permanently. Further, the backup storage array (114) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) of the invention, backup host information (116) may refer to backup or protected copies of any host information (described above). Backup host information (116) may therefore refer to replicated host information that has been transferred from the host device (102) and stored on the backup target (112) through one or many backup operation(s) (also referred to as backup process(es)). Further, backup host information (116) may encompass full backup copies (i.e., including all data and metadata pertaining to any host information granularity), incremental backup copies (i.e., including only changes to the data and metadata pertaining to any host information granularity since any previously performed backup operation(s)), or a combination thereof.

In one or many embodiment(s) of the invention, backup host information (116) may be organized or indexed across a set of data objects (not shown). Any data object may refer to a uniquely identifiable unit of, as well as a fixed size (e.g., 4 mega-byte (MB)) container for storing, unstructured information. Unstructured information, in turn, may refer to information lacking organization through clearly-defined data frameworks or models (e.g., relational databases). Examples of said unstructured information may include, but may not be limited to, video, audio, images, email, text documents, sensor data, application logs, social media data, location or geo-positioning data, and transactions. Further, any data object may store unstructured information representative of one or more granularities of backup host information (116) (e.g., one or many backup data file(s), one or many data directory (directories), etc.) (also referred to herein as item(s)).

In one or many embodiment(s) of the invention, at least a portion of the backup storage array (114) and, by association, at least a portion of the backup target (112), may also be referred to herein as object storage or an object store. Object storage (or an object store) may refer to physical storage (or logical storage occupying at least a portion of the physical storage) across which any number of data objects (described above) may be consolidated and indexed.

In one or many embodiment(s) of the invention, backup process metadata (118) may refer to information generated during or following, and descriptive of, any number of backup operations entailing the replication and transfer of any granularity of host information (described above) from the host device (102) to the backup target (112). Furthermore, backup process metadata (118) may be organized or indexed across a set of backup process metadata records (not shown), where each backup process metadata record may refer to a data structure (e.g., a table entry or row) configured to retain a backup process metadata (118) portion respective to a given granularity of backup host information (116) (i.e., an item).

Said portion of backup process metadata (118), respective to any given granularity of backup host information (116) (i.e., item), may include, but may not be limited to: (a) an information (or item) identifier (ID) assigned to the given granularity of backup host information (or item); (b) one or many object ID(s) associated with the data object(s) (described above) within/across which the given granularity of backup host information (or item) may be stored; (c) an information (or data) size reflecting a storage space size (e.g., measured in bytes) occupied or consumed by the given granularity of backup host information (or item); (d) one or many information (or data) offset(s) each indicating a position (e.g., reflected in bytes), within a respective data object and relative to a beginning thereof, where the given granularity of backup host information (or item) may be located; and (e) a status reflecting a current state of the given granularity of backup host information (or item) within the confines of the data object(s). Any portion(s) of backup process metadata (118) is/are not limited to the aforementioned specific examples.

In one or many embodiment(s) of the invention, the selective deletion service (120) may represent any physical appliance or computing system configured to leverage backup process metadata (118) in order to facilitate the selective overwriting (e.g., modification or deletion) of content (e.g., backup host information (116)) stored amongst one or many data object(s) maintained in cloud object storage (e.g., backup target (112)). To that end, and at least in part, the selective deletion service (120) may include functionality to perform the method illustrated and described with respect to FIG. 2, below. One of ordinary skill, however, will appreciate that the selective deletion service (120) may perform other functionalities without departing from the scope of the invention. Further, examples of the selective deletion service (120) may include, but may not be limited to, one or many desktop computer(s), laptop computer(s), network server(s), any other computing system(s) similar to the exemplary computing system illustrated and described with respect to FIG. 3, below, or any combination thereof.

In one or many embodiment(s) of the invention, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components and/or subcomponents, other system (100) configurations may be used without departing from the scope of the invention. For example, in one or more embodiment(s) of the invention, the system (100) may further include one or more additional host devices (not shown)—each of which may at least operatively connect to the backup target (112)—and/or one or more additional backup targets (not shown)—each to which may be operatively connected to the host device (102) and the selective deletion service (120).

Figure 2:
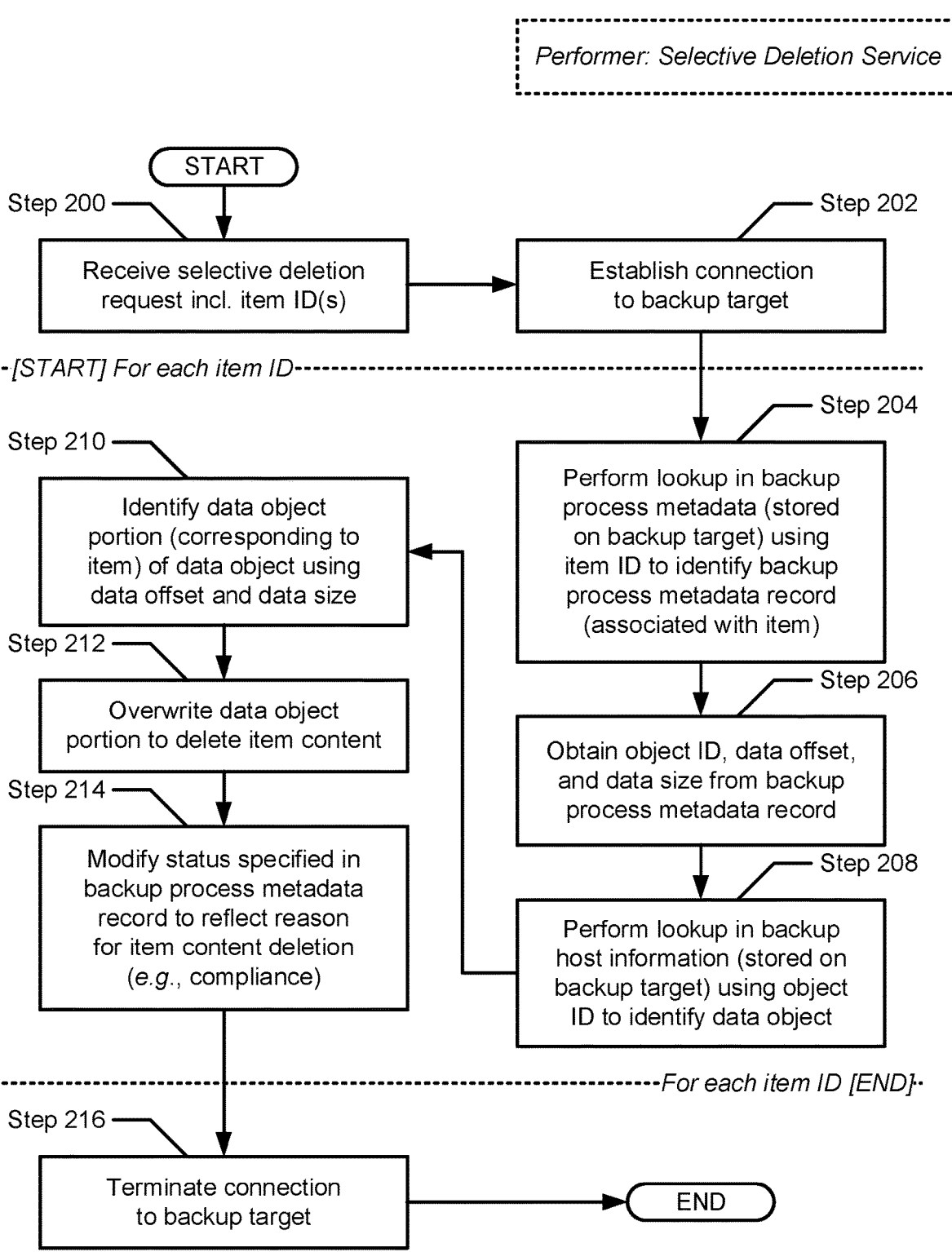
FIG. 2 shows a flowchart describing a method for leveraging backup process metadata for cloud object storage selective deletions in accordance with one or more embodiments of the invention.

FIG. 2 shows a flowchart describing a method for leveraging backup process metadata for cloud object storage selective deletions in accordance with one or more embodiments of the invention. The various steps outlined below may be performed by the selective deletion service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a selective deletion request is received. In one or many embodiment(s) of the invention, the selective deletion request may pertain to the sought modification or removal, in entirety or in part, of item content respective to one or many item(s) (i.e., one or more granularities of backup host information) maintained on a backup target. Overwriting of said item(s) may be sought for any number of reasons such as, for example, in keeping with data residency and/or data sovereignty compliances. As the overwriting may be directed to one or many item(s), the selective deletion request may include one or many item ID(s), respectively. Further, the selective deletion request may also include artifacts (e.g., an overwriting data pattern) that may be used during any overwriting process entailing the item(s).

In Step 202, a connection, to the backup target (e.g., cloud infrastructure), is established.

From here, the following several steps (i.e., Steps 204, 206, 208, 210, 212, and 214) are to be performed sequentially, thus forming an iteration, for each item ID in the one or many item ID(s) (received via the selective deletion request in Step 200). That is, a first iteration of said several steps may be performed for a first item ID; a second iteration of said several steps may be performed for a second item ID (if any); and so forth, including a last iteration of said several steps that may be performed for a last item ID (if any).

In Step 204, a lookup is performed across the backup process metadata, maintained on the backup target, using the item ID (received in Step 200). In one or many embodiment(s) of the invention, said lookup may result in the identification of a backup process metadata record, where the identified backup process metadata record may correspond to an item and, therefore, may at least specify the item ID assigned to said item.

In Step 206, various information is obtained or extracted from the backup process metadata record (identified in Step 204). In one or many embodiment(s) of the invention, said various information may include: (a) one or many object ID(s) associated with and uniquely identifying, respectively, one or many data object(s) within which the item (or item content thereof), in whole or in part, may be stored; (b) one or many data offset(s) each indicating a position (e.g., reflected in bytes), within a respective data object and relative to a beginning thereof, where the item (or item content thereof) may be located; and (c) one or many data size(s) each reflecting a storage space size (e.g., measured in bytes) occupied or consumed by the item (or item content thereof) in a respective data object.

In Step 208, a lookup is performed in the backup host information, maintained on the backup target, using the object ID(s) (obtained in Step 206). In one or many embodiment(s) of the invention, said lookup may result in the identification of one or many data object(s) with which the object ID(s) may be associated, respectively.

In Step 210, one or many data object portion(s), respective to the data object(s) (identified in Step 208), is/are identified. In one or many embodiment(s) of the invention, the data object portion(s) may each correspond to the item (or item content thereof) sought to be overwritten (e.g., via modification or deletion). Further, the data object portion(s) may be identified, respectively, using the data offset(s) and the data size(s) (obtained in Step 206). That is, any identified data object portion may be located at a position within their respective data object (and relative to a denoted beginning thereof) as specified by their respective data offset, and may extend a given length from said position, within their respective data object, as specified by their respective data size.

In Step 212, existing item content, for the item and within the confines of the data object portion(s) (identified in Step 210), is overwritten (e.g., via modification or deletion). In one or many embodiment(s) of the invention, overwriting of the existing item content may employ any artifact(s) (e.g., an overwriting data pattern) that may have been specified in the selective deletion request (received in Step 200).

In Step 214, the backup process metadata record (identified in Step 204) is revisited. More specifically, in one or many embodiment(s) of the invention, a status describing a current state of the item (or item content thereof), which may be specified in the backup process metadata record, may be modified. Further, the modified status may reflect the overwriting action (e.g., modification, deletion, etc.), and/or the reason(s) (e.g., data regulatory compliances) behind said overwriting action, applied to the item (or item content thereof).

In Step 216, after processing each item ID of the item ID(s) (received via the selective deletion request in Step 200), the connection (established in Step 202), to the backup target, is terminated.

Figure 3:
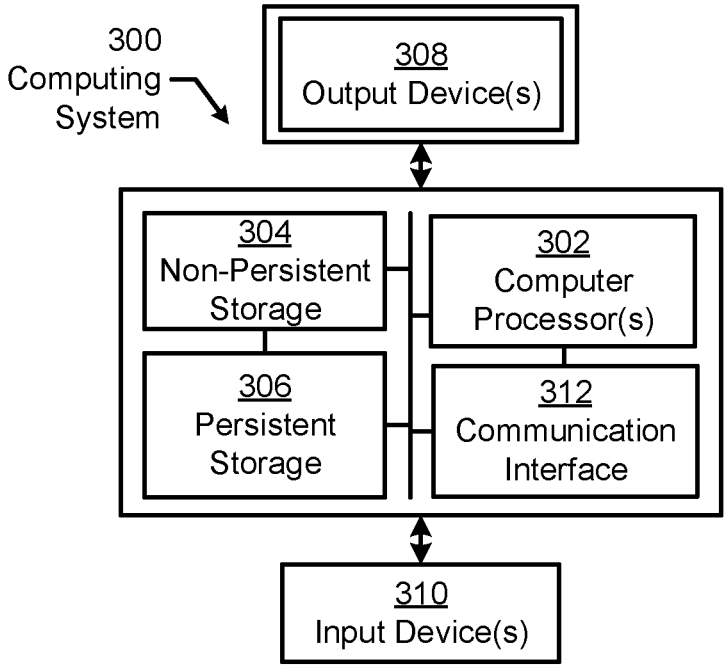
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one or many embodiment(s) of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one or many embodiment(s) of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4A:
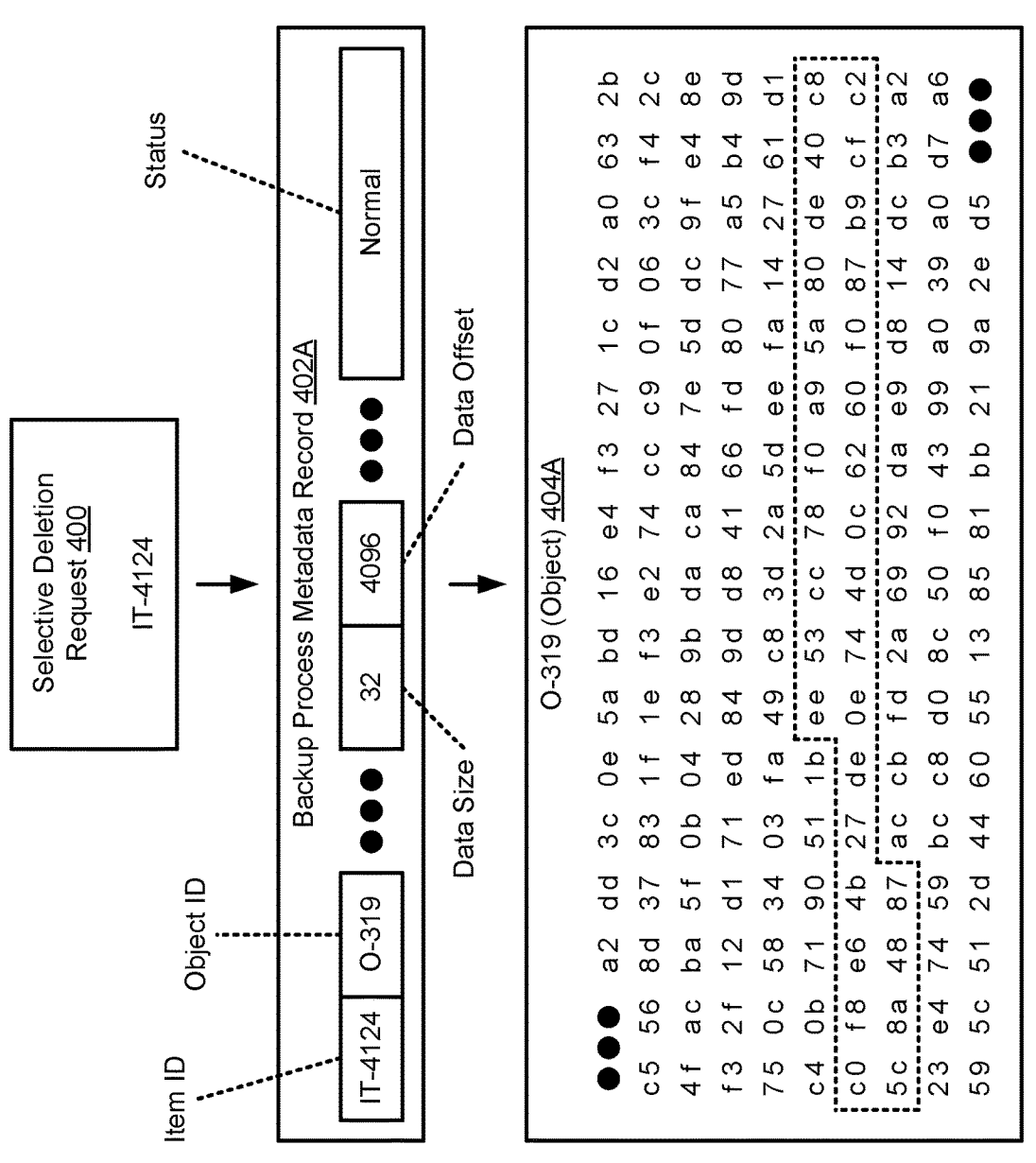
FIGS. 4A and 4B show an exemplary scenario in accordance with one or more embodiments of the invention.
Figure 4B:
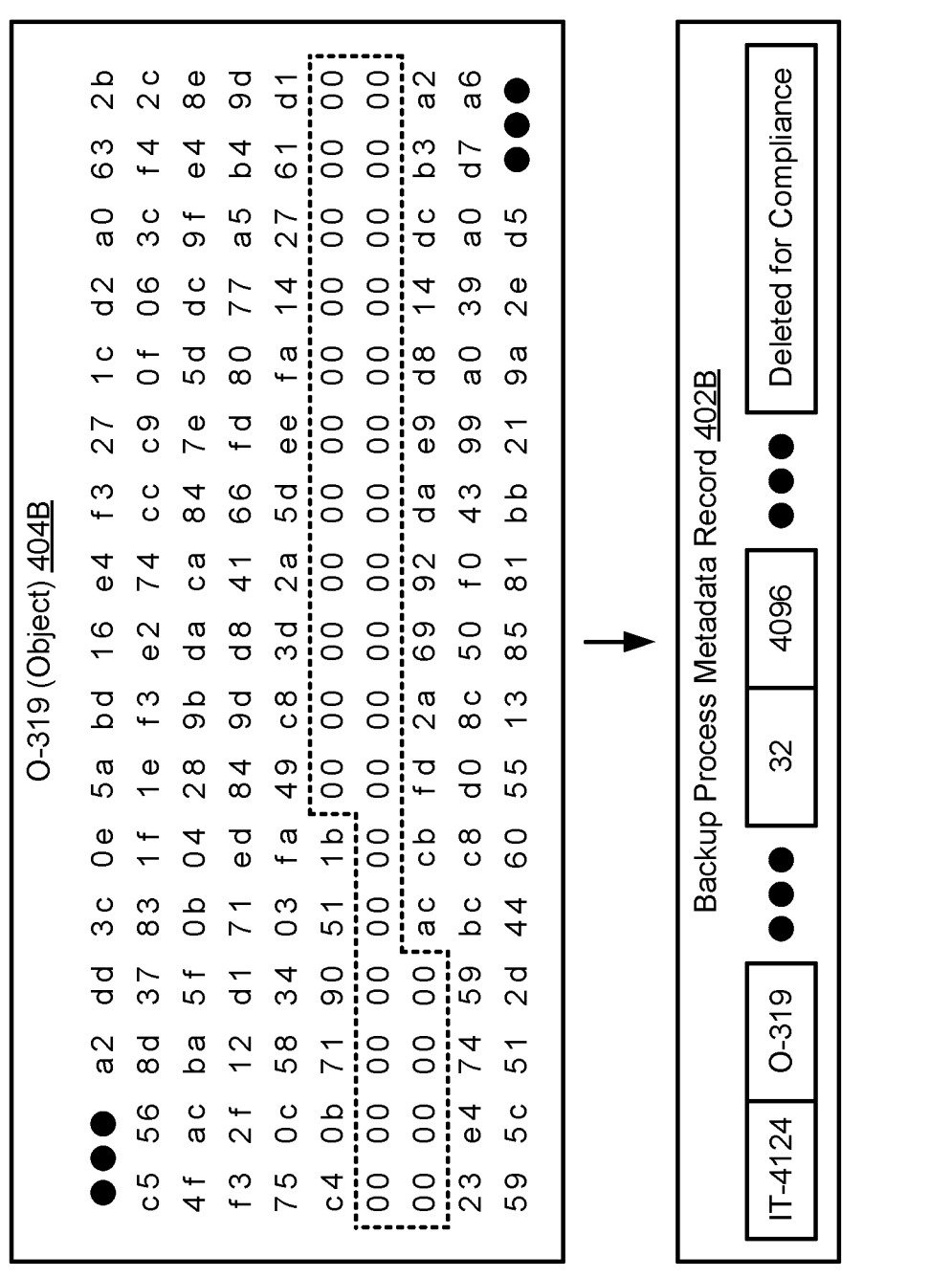

FIGS. 4A and 4B show an exemplary scenario in accordance with one or more embodiments of the invention. The exemplary scenario, illustrated through FIGS. 4A and 4B and described below, is for explanatory purposes only and not intended to limit the scope of the exemplary invention.

For context concerning the exemplary scenario, consider the following background: in providing social media services, Company X manages vast collections of unstructured data (e.g., in the form of multimedia, chat messages, posts, user biographic and demographic data, etc.). Further, to safeguard said unstructured data, Company X periodically performs backup processes targeting the unstructured data, which entails storing the unstructured data into (data) objects, and subsequently, uploading said objects into cloud object storage. Often, more than one form of unstructured data are stored together across one or many (shared) object(s).

The cloud object storage, moreover, is implemented using storage servers that are physically located in Geographic Location Y. Like many territories, Geographic Location Y has and enforces local data residency (e.g., regulatory compliance) laws, which, among other guidelines, mandates that certain unstructured data (e.g., morally reprehensible multimedia) must not be stored physically within the borders of Geographic Location Y. To comply with the local data residency laws of Geographic Location Y, Company X proceeds to perform selective overwrites (i.e., via deletions), affecting any instance(s) of the certain unstructured data, which have been stored across one or many object(s) maintained on the cloud object storage.

Through components, portrayed in FIGS. 4A and 4B, selective overwriting, in accordance with embodiments disclosed herein, and as it applies to one such non-limiting instance of the above-mentioned certain unstructured data, is described hereinafter.

Turning to FIG. 4A, a selective deletion request (400) is generated/received, where the selective deletion request (400) specifies an item ID [IT-4124], as well as an overwriting data pattern (not shown) ["00"]. Using the item ID [IT-4124], which pertains to a select item (i.e., the sought certain unstructured data instance), a backup process metadata record (402A) is identified. The backup process metadata record (402A) is associated with the select item and, in addition to the item ID [IT-4124], also specifies other information relevant to a completed backup process that had at least targeted the select item—said other information including: an object ID [O-319], a data size [32 (bytes)], a data offset [4096 (bytes)], and an item content status [Normal].

Subsequently, using the object ID [0-319], which pertains to a select object (i.e., in which at least the item content of the select item is stored), a (data) object (404A) is identified. The object (404A) contains various unstructured data expressed and/or recorded in a hexadecimal format.

Next, within the object (404A), an existing item content of the select item, reflected by an identified (data) object portion [denoted by the dotted subarea of hexadecimal numbers] of the object (404A), is identified using the data offset [4096 (bytes)] in conjunction with the data size [32 (bytes)].

Turning to FIG. 4B, the existing item content of the select item (i.e., the identified object portion) is overwritten using the request-specified overwriting data pattern ["00"], thereby resulting in a modified object (404B).

Lastly, the backup process metadata record (402A) (see e.g., FIG. 4A), associated with the select item, is revisited. The item content status specified therein is identified and then modified to reflect the overwriting action, as well as the reason [Deleted for Compliance] as to why the overwriting action had been performed, thereby resulting in a modified backup process metadata record (402B).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing selective overwrites in backup data, the method comprising:

identifying, by a first computing system comprising a processor and memory, an item representing select backup host information stored on a backup target associated with a selective deletion request, wherein:

the backup target comprises at least a second computing system residing on a cloud computing environment, and the first computing system is operatively connected to the backup target;

identifying, by the first computing system, in association with the item, a data object stored on the backup target and a data object portion of the data object, wherein:

the data object comprises a portion of unstructured data associated with the item, and the portion of unstructured data comprises at least one of:

videos, audio, images, emails, text documents, sensor data, application logs, social media data, location or geo-positioning data, and transactions, and the data object is identified from a backup process metadata record associated with the item, and the backup process metadata record comprises a status describing a state of the portion of unstructured data within the data object;

overwriting, by the first computing system, a sub-portion of the unstructured data of the item reflected in the data object portion stored in the backup target using an artifact specified by the selective deletion request; and modifying, after the overwriting and by the first computing system, in the backup process metadata record, the status to reflect:

a reason for overwriting the sub-portion of unstructured data, wherein the reason is a data regulatory compliance reason, wherein the data regulatory compliance reason is prevention of certain unstructured data from being stored in a specific geographical region, and an action associated with overwriting the sub-portion of unstructured data, wherein the action comprises modification or deletion of any instance of the sub-portion of unstructured data affected by the data regulatory compliance reason.

2. The method of claim 1, wherein the data object comprises the data object portion and a second data object portion, and wherein the second data object portion reflects second item content associated with a second item representing second select backup host information.

3. The method of claim 1, wherein the metadata comprises a data offset and a data size both associated with the item.

4. The method of claim 3, wherein the data object portion is identified using the data offset in conjunction with the data size.

5. The method of claim 3, the method further comprising:

identifying, by the first computing system, in association with the item, a second data object stored on the backup target and a second data object portion of the second data object; and overwriting, by the first computing system, second item content of the item reflected in the second data object portion.

6. A non-transitory computer readable medium (CRM) comprising computer readable program code, which when executed by a computer processor, enables the computer processor to perform a method for implementing selective overwrites in backup data, the method comprising:

identifying, by a first computing system comprising a processor and memory, an item representing select backup host information stored on a backup target associated with a selective deletion request, wherein:

the backup target comprises at least a second computing system residing on a cloud computing environment, and the first computing system is operatively connected to the backup target;

identifying, by the first computing system, in association with the item, a data object stored on the backup target and a data object portion of the data object, wherein:

the data object comprises a portion of unstructured data associated with the item, and the portion of unstructured data comprises at least one of:

videos, audio, images, emails, text documents, sensor data, application logs, social media data, location or geo-positioning data, and transactions, and the data object is identified from a backup process metadata record associated with the item, and the backup process metadata record comprises a status describing a state of the portion of unstructured data within the data object;

overwriting, by the first computing system, a sub-portion of the unstructured data of the item reflected in the data object portion stored in the backup target using an artifact specified by the selective deletion request; and modifying, after the overwriting and by the first computing system, in the backup process metadata record, the status to reflect:

a reason for overwriting the sub-portion of unstructured data, wherein the reason is a data regulatory compliance reason, wherein the data regulatory compliance reason is prevention of certain unstructured data from being stored in a specific geographical region, and an action associated with overwriting the sub-portion of unstructured data, wherein the action comprises modification or deletion of any instance of the sub-portion of unstructured data affected by the data regulatory compliance reason.

7. The non-transitory CRM of claim 6, wherein the data object comprises the data object portion and a second data object portion, and wherein the second data object portion reflects second item content associated with a second item representing second select backup host information.

8. The non-transitory CRM of claim 6, wherein the metadata comprises a data offset and a data size both associated with the item.

9. The non-transitory CRM of claim 8, wherein the data object portion is identified using the data offset in conjunction with the data size.

10. The non-transitory CRM of claim 8, the method further comprising:

identifying, by the first computing system, in association with the item, a second data object stored on the backup target and a second data object portion of the second data object; and overwriting, by the first computing system, second item content of the item reflected in the second data object portion.

11. A system, the system comprising:

a backup target storing backup host information, wherein the backup target comprises at least a second computing system residing on a cloud computing environment; and a first computing system comprising a computer processor operatively connected to the backup target, and configured to perform a method for implementing selective overwrites in backup data, the method comprising:

identifying, by the first computing system, an item representing select backup host information stored on a backup target associated with a selective deletion request;

identifying, by the first computing system, in association with the item, a data object stored on the backup target and a data object portion of the data object, wherein:

the data object comprises a portion of unstructured data associated with the item, and the portion of unstructured data comprises at least one of: videos, audio, images, emails, text documents, sensor data, application logs, social media data, location or geo-positioning data, and transactions, and the data object is identified from a backup process metadata record associated with the item, and the backup process metadata record comprises a status describing a state of the portion of unstructured data within the data object;

overwriting, by the first computing system, a sub-portion of the unstructured data of the item reflected in the data object portion stored in the backup target using an artifact specified by the selective deletion request; and modifying, after the overwriting and by the first computing system, in the backup process metadata record, the status to reflect:

a reason for overwriting the sub-portion of unstructured data, wherein the reason is a data regulatory compliance reason, wherein the data regulatory compliance reason is prevention of certain unstructured data from being stored in a specific geographical region, and an action associated with overwriting the sub-portion of unstructured data, wherein the action comprises modification or deletion of any instance of the sub-portion of unstructured data affected by the data regulatory compliance reason.

* * * * *